US012771900B2

(12) United States Patent
Cheng

(10) Patent No.: US 12,771,900 B2
(45) Date of Patent: Oct. 20, 2026

(54) METHOD, APPARATUS, ELECTRONIC DEVICE AND STORAGE MEDIUM FOR CAMERA FUNCTION PAGE SWITCHING

(71) Applicant: Beijing Zitiao Network Technology Co., Ltd., Beijing (CN)

(72) Inventor: Qingdong Cheng, Beijing (CN)

(73) Assignee: Beijing Zitiao Network Technology Co., Ltd., Beijing (CN)

(*) Notice: Subject to any disclaimer, the term of this patent is extended or adjusted under 35 U.S.C. 154(b) by 0 days.

(21) Appl. No.: 18/852,383

(22) PCT Filed: Mar. 29, 2023

(86) PCT No.: PCT/CN2023/084887

§ 371 (c)(1),
(2) Date: Sep. 27, 2024

(87) PCT Pub. No.: WO2023/185968

PCT Pub. Date: Oct. 5, 2023

(65) Prior Publication Data

US 2025/0220264 A1 Jul. 3, 2025

(30) Foreign Application Priority Data

Mar. 30, 2022 (CN) ......................... 202210330864.4

(51) Int. Cl.
*H04N 21/43* (2011.01)
*G06T 5/70* (2024.01)
(Continued)

(52) U.S. Cl.
CPC ........... *H04N 21/4318* (2013.01); *G06T 5/70* (2024.01); *G06T 7/70* (2017.01); *H04N 21/4312* (2013.01);
(Continued)

(58) Field of Classification Search
None
See application file for complete search history.

(56) References Cited

U.S. PATENT DOCUMENTS

2024/0265601 A1* 8/2024 Anvaripour ......... G06F 3/04845

FOREIGN PATENT DOCUMENTS

CN 104902305 A 9/2015
CN 106375661 A 2/2017
(Continued)

OTHER PUBLICATIONS

International Patent Application No. PCT/CN2023/084887; Int'l Search Report; dated Jun. 16, 2023; 2 pages.
(Continued)

*Primary Examiner* — Samira Monshi
(74) *Attorney, Agent, or Firm* — BakerHostetler

(57) ABSTRACT

Embodiments of the disclosure provide a method, electronic device, and storage medium for camera function page switching. A video editing page is started based on a selected first video. In response to a shooting trigger instruction for the video editing page, the video editing page is closed, and a video shooting page is started. A preview image is obtained based on the first video, and the preview image is displayed in the video shooting page, wherein the preview image includes at least one video frame generated based on the first video. A second video is collected through the camera unit after initialization of the camera unit is completed. The video editing page is jumped to, and a synthesized video is played through the video editing page, where the synthesized video is generated after processing the first video and the second video based on a target editing operation.

20 Claims, 6 Drawing Sheets

(51) Int. Cl.
*G06T 7/70* (2017.01)
*H04N 21/431* (2011.01)
*H04N 23/63* (2023.01)

(52) U.S. Cl.
CPC . *H04N 23/632* (2023.01); *G06T 2207/30244* (2013.01)

(56) References Cited

FOREIGN PATENT DOCUMENTS

| | | | |
|---|---|---|---|
| CN | 106561044 | A | 4/2017 |
| CN | 107645674 | A | 1/2018 |
| CN | 108600622 | A | 9/2018 |
| CN | 108900791 | A | 11/2018 |
| CN | 109040584 | A | 12/2018 |
| CN | 109426525 | A | 3/2019 |
| CN | 109511013 | A | 3/2019 |
| CN | 110855601 | A | 2/2020 |
| CN | 112333491 | A | 2/2021 |
| CN | 112465937 | A | 3/2021 |
| CN | 113032030 | A | 6/2021 |
| CN | 113473005 | A | 10/2021 |
| CN | 113766120 | A | 12/2021 |
| CN | 113811855 | A | 12/2021 |
| CN | 113923357 | A | 1/2022 |
| JP | 2008-109426 | A | 5/2008 |

OTHER PUBLICATIONS

China Patent Application No. 202210330864.4; Office Action; dated Jul. 15, 2026; 19 pages.

* cited by examiner

METHOD, APPARATUS, ELECTRONIC DEVICE AND STORAGE MEDIUM FOR CAMERA FUNCTION PAGE SWITCHING

CROSS-REFERENCE

This application is a national phase filing of International Patent Application No. PCT/CN2023/084887, filed Mar. 29, 2023, which claims the priority of Chinese Patent Application No. 202210330864.4, filed on Mar. 30, 2022, and entitled "METHOD, APPARATUS, ELECTRONIC DEVICE AND STORAGE MEDIUM FOR CAMERA FUNCTION PAGE SWITCHING", the disclosures of which are incorporated herein in their entireties.

FIELD

Embodiments of the present disclosure relates to the field of intelligent terminals and the Internet technology, in particular to a method, apparatus, electronic device, storage medium, computer program product and computer program for camera function page switching.

BACKGROUND

At present, the camera function based on camera unit has become one of the basic functions of intelligent terminal device. Many Internet applications (APP) may call the camera unit through the terminal device to implement a series of functions such as video recording, video editing, uploading, and sharing.

In related technologies, when calling the camera unit for video shooting, APP may provide at least two function pages, that is, a video shooting page and a video editing page. Usually, the video shooting page is the default page of the camera function. A real-time shooting content is displayed through the video shooting page. After the shooting is completed, the video is edited or viewed through the video editing page.

However, in the actual use process, when returning to the video shooting page from the video editing page, the video shooting page cannot display the real-time shooting content at the first time, but will appear a black screen, affecting the smoothness and visual experience of the APP operation, and reducing the user experience.

SUMMARY

The embodiments of the present disclosure provide a method, apparatus, electronic device, storage medium, computer program product and computer program for camera function page switching to overcome the problem of black screen when returning from a video editing page to a video shooting page.

In a first aspect, the embodiments of the present disclosure provide a method of camera function page switching, which is applied to a terminal device. The terminal device has a camera unit. The method includes: starting, based on a selected first video, a video editing page for editing the first video based on an editing instruction input by a user; in response to a shooting trigger instruction for the video editing page, closing the video editing page and starting a video shooting page; obtaining a preview image based on the first video, and displaying the preview image in the video shooting page, wherein the preview image comprises at least one video frame generated based on the first video; collecting a second video through the camera unit after initialization of the camera unit is completed; jumping to the video editing page and playing a synthesized video through the video editing page, wherein the synthesized video is generated after processing the first video and the second video based on a target editing operation.

In a second aspect, the embodiments of the present disclosure provide an apparatus for camera function page switching, including:

- a shooting module configured for in response to a shooting trigger instruction for the video editing page, closing the video editing page and starting a video shooting page;
- an initialization module configured for obtaining a preview image based on the first video, and displaying the preview image in the video shooting page, wherein the preview image comprises at least one video frame generated based on the first video;
- the shooting module further configured for collecting a second video through the camera unit after initialization of the camera unit is completed; and
- the editing module further configured for jumping to the video editing page and playing a synthesized video through the video editing page, wherein the synthesized video is generated after processing the first video and the second video based on a target editing operation.

In a third aspect, the embodiments of the present disclosure provide an electronic device, including:

- a processor, and a memory in communication connection with the processor;
- the memory storing computer execution instructions;
- the processor executing the computer execution instructions stored in the memory to implement the method of camera function page switching described in the first aspect above and various possible designs in the first aspect.

In a fourth aspect, the embodiments of the present disclosure provide a computer readable storage medium, in which a computer execution instruction is stored. A processor executes the computer execution instruction to implement the method of camera function page switching described in the first aspect above and various possible designs in the first aspect.

In a fifth aspect, the embodiments of the present disclosure provide a computer program product, which includes a computer program. When the computer program is executed by a processor, the method of camera function page switching described in the first aspect above and various possible designs in the first aspect are implemented.

In a sixth aspect, the embodiments of the present disclosure provide a computer program that, when executed by a processor, implements the method of camera function page switching described in the first aspect above and various possible designs in the first aspect.

BRIEF DESCRIPTION OF THE DRAWINGS

To describe the technical solutions more clearly in the embodiments of the present disclosure or related technologies, the following will briefly introduce the drawings needed in the embodiments or related technical descriptions. Apparently, the drawings in the following description are some embodiments of the present disclosure. For ordinary technicians in the art, they can also obtain other drawings from these drawings without paying creative efforts.

DETAILED DESCRIPTION

To make the purpose, technical solution and advantages of the embodiments of the present disclosure clearer, the technical solution in the embodiments of the present disclosure will be described clearly and completely below in combination with the drawings in the embodiments of the present disclosure. Apparently, the described embodiments are a part of the embodiments of the present disclosure, not all the embodiments. Based on the embodiments in the disclosure, all other embodiments obtained by ordinary technicians in the art without doing creative efforts fall within the scope of the protection of the present disclosure.

An application scenario of the embodiments of the present disclosure is explained below.

Figure 1A:
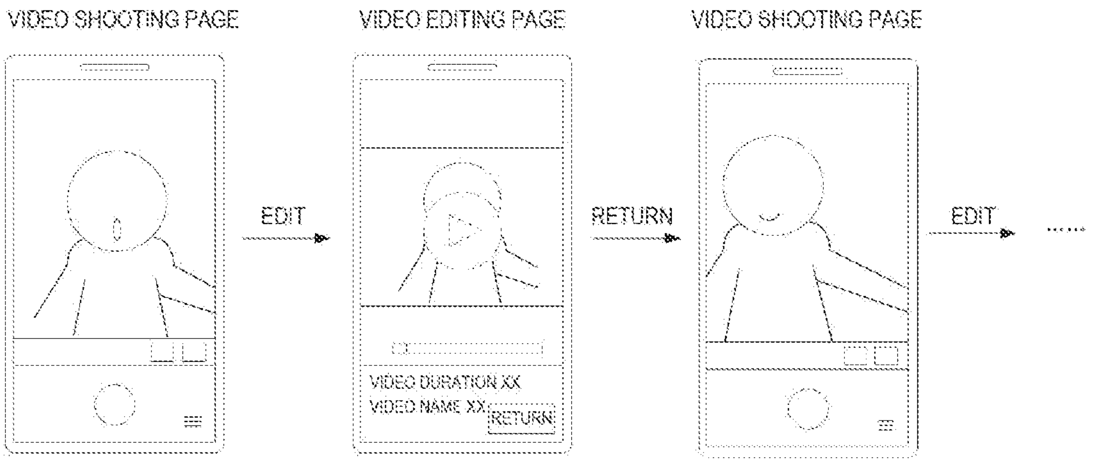
FIG. 1A is a schematic diagram of an application scenario of a method of camera function page switching provided by the embodiments of the present disclosure.

The method of camera function page switching provided by the embodiments of the present disclosure, for example, may be applied to application scenarios such as video shooting, editing, uploading and sharing of video APP and social APP. Specifically, the method provided in the embodiments of the present disclosure may be applied to a terminal device, such as a smart phone. The terminal device has a camera unit, such as a camera module for image collecting. For example, a video APP is running in the terminal device. This video APP implements video shooting, editing and other functions by displaying different camera function page on the terminal device and combining interactive operation instructions input by users. FIG. 1A is a schematic diagram of an application scenario of a method of camera function page switching provided by the embodiments of the present disclosure. Specifically, the application scenario is an application scenario of short video shooting. As shown in FIG. 1A, for example, the short video APP provides two interfaces: a video shooting page and a video editing page. Herein, the video shooting page is used to call the camera unit to display real-time images, and the user may shoot the short video by observing and operating the video shooting page. Then, after reaching a predetermined shooting duration of the short video APP, the video editing page is entered, and the video information (video duration, video name, etc.) is displayed in the video editing page. The previously shot short video clips are displayed and played back, and the short video clips may be edited in combination with the editing instruction input by the user. Then, after editing, the video shooting page is returned to (by clicking a return button), so that users may conveniently and quickly continue to shoot short videos, to meet the needs of the process of "shooting-editing-shooting-editing" repeatedly under the application scenario of short video shooting, thereby achieving the purpose of video synthesizing based on the videos taken many times (at least twice) and synthesized video generating. Further, the function of generating synthesized video based on the process of "shooting-editing-shooting-editing" may be implemented through a specified function mode of APP, such as "selected shooting mode", "synthesized shooting mode", etc.

Figure 1B:
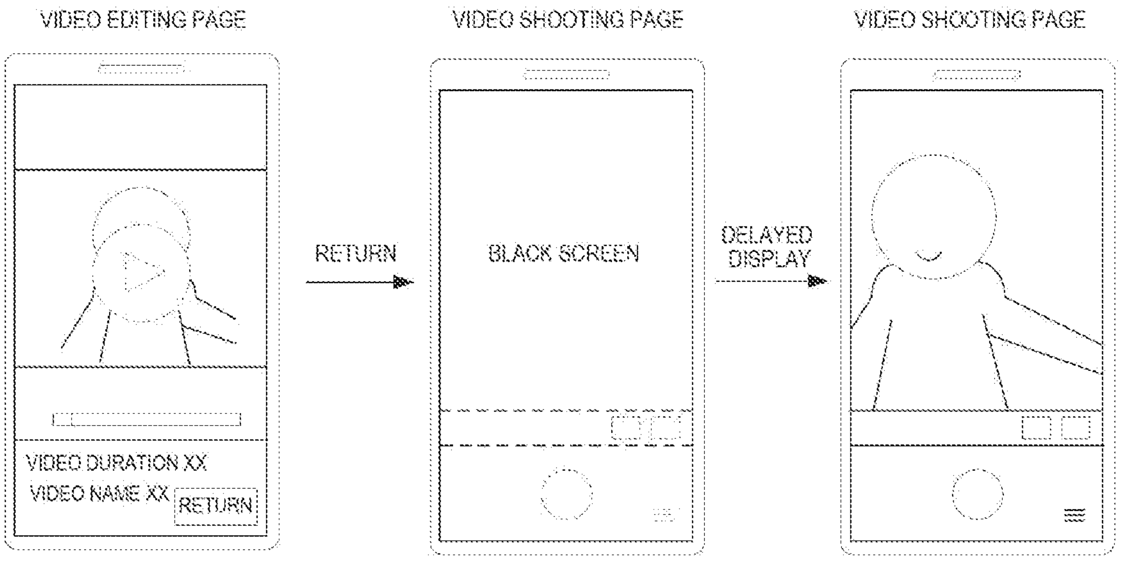
FIG. 1B is a schematic diagram of black screen phenomenon in a process of camera function page switching in related technologies.

FIG. 1B is a schematic diagram of black screen phenomenon in a process of camera function page switching in related technologies. As shown in FIG. 1B, in the actual use process, when returning to the video shooting page from the video editing page, the video shooting page may delay the display of a real-time image taken by the camera unit, which may lead to a black screen, affecting the smoothness and appearance of the APP operation and reducing the user experience.

After making creative efforts, the inventor found that this is because: after inputting the video editing page from the video shooting page of the APP, the camera unit may enter a non-working state, and then when returning to the video shooting page from the video editing page, the camera unit needs to restart and initialize. During this process, the camera unit cannot collect images, so there is no real-time image to be displayed in the video shooting page, forming a black screen. Therefore, how to obtain realistic images in the initialization phase of the camera unit and display them in the video shooting page to simulate the real time images shot by the camera unit, thereby causing the video shooting page to be instantly started in appearance, is an urgent problem to be solved. The embodiments of the present disclosure provide a method of camera function page switching to solve the above problem.

Figure 2:
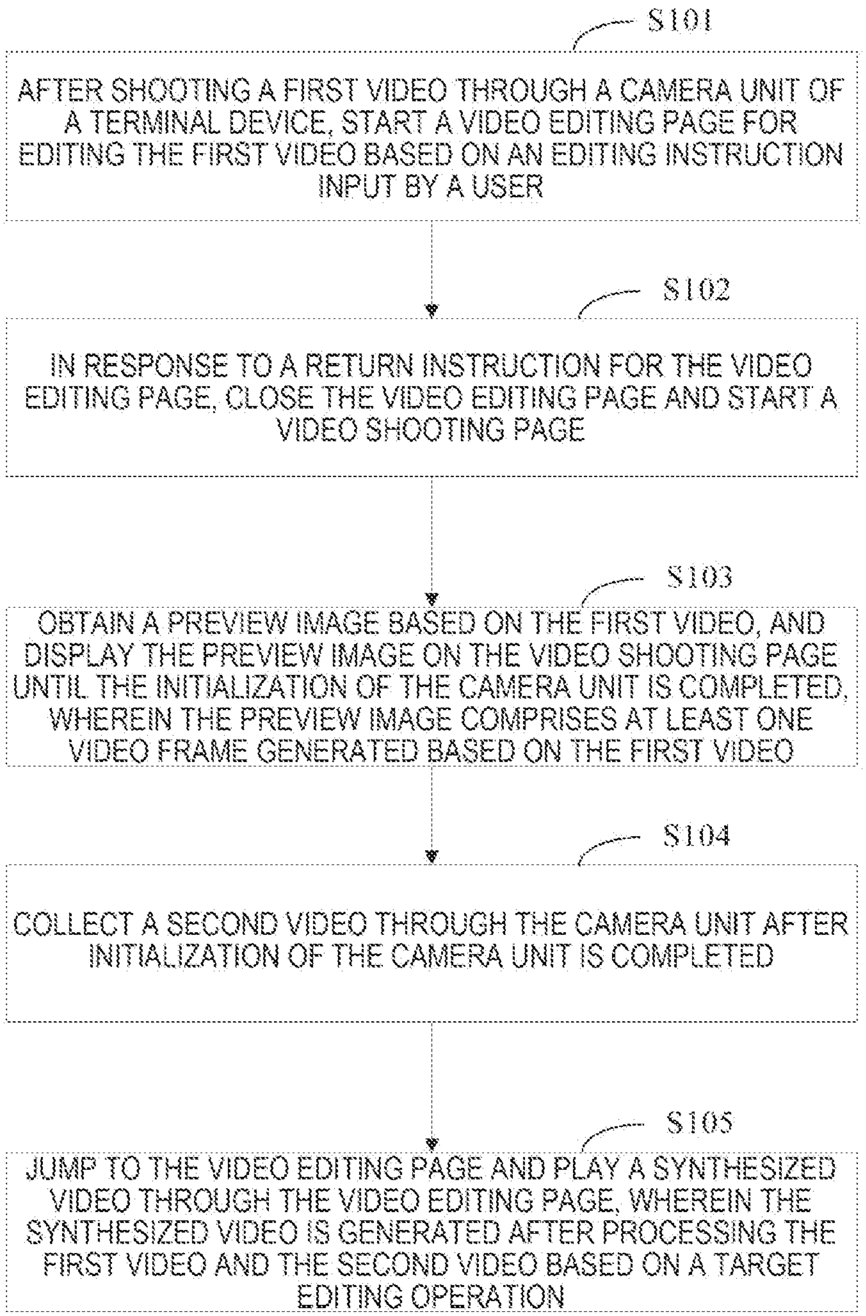
FIG. 2 is a flowchart I of a method of camera function page switching provided by the embodiments of the present disclosure.

Referring to FIG. 2, which is a flowchart I of a method of camera function page switching provided by the embodiments of the present disclosure. The method of the embodiments of the present disclosure may be applied in the terminal device. The terminal device has a camera unit. The method of camera function page switching includes the following steps.

At step S101: start, based on a selected first video, a video editing page for editing the first video based on an editing instruction input by a user.

For example, referring to the schematic diagram of the application scenario shown in FIG. 1A, in one possible implementation, after the APP in the terminal device runs and enters the corresponding video function interface, the APP will start and display the video shooting page, and at the same time, by calling the camera unit, the real-time image collected by the camera unit is displayed in the video shooting page, and the user may observe and operate the video shooting page to shoot the video through the camera unit, thus obtaining the selected first video. This process is a general process of video shooting in existing technology and will not be repeated here. In another possible implementation, the first video may be shot in advance and stored locally in the terminal device, and a video may be selected as the first video through the user's selection operation.

Further, after obtaining the first video, the video editing page may be started based on the operation instruction input by the user, such as the instruction generated for a gesture operation of a control "enter a video editing page". Alternatively, after obtaining the first video, the editing page may be automatically started according to the predetermined program logic without user operation, which may be set according to specific needs, and no more examples will be given one by one.

Herein, the video editing page may be a program function module including a display interface provided in the APP, and the video editing page is used to edit the first video based on an editing instruction input by the user. Specifically, through the video editing page, for example, video playback, video information display (such as video duration, video size, resolution, etc.) and other display functions may be implemented for the previously shot video (the first video). For another example, the video information modification (such as video name modification, classification tag modification, etc.), video compression, video uploading, video publishing and other functions may be implemented for the previously shot video (the first video), thereby implementing various editing operations for the first video after recording. It may be set according to specific needs. The functions of editing the first video that may be implemented in the video editing page are not specifically limited here. Meanwhile, based on the specific functions of the video editing page, the layout and style of various controls and icons in the display interface of the video editing page may also be set as needed, which will not be detailed here.

After the video editing page is started, the user may view the video and related information through the interactive interface of the terminal device, and then perform corresponding editing operations on the video. The specific editing operations have been illustrated in the previous steps and will not be repeated here. Of course, users may also view without editing in the video editing page, which will not be repeated here.

At step S102: in response to a shooting trigger instruction for the video editing page, close the video editing page and start a video shooting page.

For example, after completing the above steps, the user inputs a return operation to the terminal device, and the terminal device generates and responds to a corresponding shooting trigger instruction, which is used to close the video editing page and return to the video shooting page. Herein, for example, the video shooting page, similar to the video editing page, may be a program function module including a display interface provided in the APP, which displays the real-time images collected by the camera unit by calling the interface of the camera unit provided by the operating system. Starting the video shooting page is the process of starting the program function module. Herein, the video shooting page includes at least one control for saving the real-time image collected by the camera unit as video data, i.e., a shooting control. After the shooting control is triggered, the terminal device will start video shooting.

In one possible implementation, after closing the video editing page and before starting the video shooting page, the following steps are also included.

A rendering environment is set as an initialized rendering environment, where the initialized rendering environment is used to draw the video shooting page and the preview image in the display interface.

Specifically, the terminal device has a display interface, and the video shooting page and video editing page are displayed through the display interface. While the video shooting page and video editing page are displayed through the display interface, the rendering environment needs to be supported. Specifically, the rendering environment includes rendering methods, types, parameters, and other information. Since the video shooting page and video editing page are implemented through different program function modules, they correspond to different rendering environment. After the video editing page, to implement the subsequent display of the video shooting page, the rendering environment needs to be initialized, and the rendering environment needs to be set to the initialized rendering environment, so that the video shooting page may be displayed normally.

At step S103: obtain a preview image based on the first video, and display the preview image in the video shooting page, wherein the preview image comprises at least one video frame generated based on the first video.

For example, the preview image is image data generated from the first video. Specifically, the preview image includes at least one video frame generated based on the first video. In one possible implementation, the preview image includes one video frame in the first video, that is, a picture, such as the last frame image of the first video. After starting the video shooting page, it takes a certain time for the camera unit to start and initialize, such as 400 ms. During this period, the real collected real-time image cannot be obtained through the camera unit, so the real-time image cannot be displayed instantaneously in the video shooting page, resulting in a black screen. In the embodiments of the present disclosure, by intercepting at least one frame of data from the first video and displaying it in the video shooting page, the video shooting page is instantly started in appearance to avoid the black screen problem.

In another possible implementation, the preview image includes a plurality of continuous frames of pictures, that is, the preview image may be regarded as a video clip, such as the last 0.1 second video clip in the first video. More specifically, displaying the preview image in the video shooting page includes displaying the plurality of continuous frames of pictures sequentially in the video shooting page within a predetermined duration. The predetermined duration characterizes an initialization duration of the camera unit. In the step of the embodiments of the present disclosure, by displaying the plurality of consecutive frames (video clip) in the first video as the preview image in the video shooting page, the display smoothness and authenticity of the video shooting page may be further improved and the visual effect may be improved while avoiding the black screen problem.

Meanwhile, referring to the schematic diagram of the application scenario shown in FIG. 1A, because in the application scenario used in the method of the embodiments of the present disclosure, when the user shoots a short video through the terminal device, the process of "shooting-editing-shooting-editing" will be repeatedly implemented. Therefore, when the user takes a shot again (at least for the second time), the image actually collected by the camera unit will have certain similarity in content with the first video shot last time. Therefore, by generating a prediction frame from the video frames in the first video shot previously, a realistic display effect may be implemented, making the "simulated image" (preview image) displayed in the video shooting page more similar to the real-time image actually shot by the camera unit, making it impossible (or difficult) for the user to find that the current display is a "simulated image", improving the display effect and user perception.

Furthermore, after step S103, the method further includes the following steps.

At step S104: collect a second video through the camera unit after initialization of the camera unit is completed.

At step S105: jump to the video editing page and play a synthesized video through the video editing page, wherein the synthesized video is generated after processing the first video and the second video based on a target editing operation.

For example, after the camera unit is initialized, the terminal device collects real-time images through the camera unit, and the real-time images are displayed in the video shooting page. Since the preview image used in the above steps is generated through the video frame in the first video, the similarity between the preview image and the real-time image actually collected by the camera unit is higher. Therefore, after the camera unit initializes and displays the real-time image in the video shooting page, the frame skipping phenomenon between the two images (that is, the preview image and the real-time image) is smaller, even making it difficult for the user to find the frame skipping phenomenon and improving the smoothness of starting the video shooting page.

Further, after the camera unit is initialized, the method further includes the following.

The second video is obtained by collecting real-time images through the camera unit. The video editing page is started and jumped to, and the synthesized video is played through the video editing page. The synthesized video is generated after processing the first video and the second video based on a target editing operation.

For example, after the real-time image is collected through the camera unit, the second video is obtained, and the user may further edit the second video. In this case, the terminal device responds to a jumping instruction input by the user, starts and jumps to the video editing page to edit the second video. Specifically, in one possible implementation, the terminal device synthesizes the first video and the second video to generate a better-quality synthesized video. More specifically, compared with the second video, the synthesized video may have at least one of the following advantages: higher frame rate, higher resolution, and fewer noise points. So that the APP may generate better-quality videos in the function mode of the process of "shooting-editing-shooting-editing".

Figure 3:
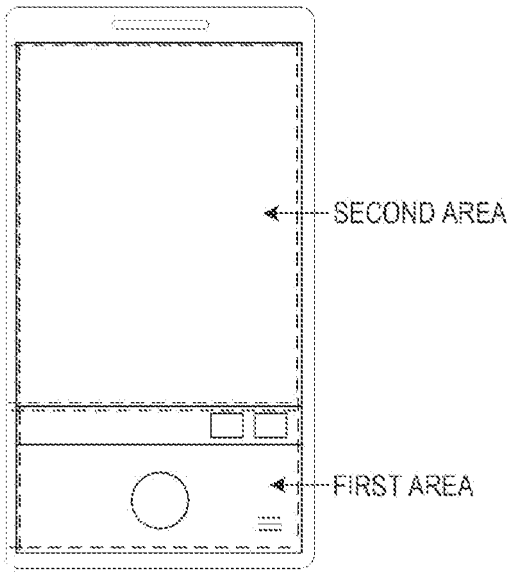
FIG. 3 is a schematic diagram of displaying a preview image in a video shooting page provided by the embodiments of the present disclosure.

Herein, for example, the video shooting page is displayed through the display interface of the terminal device. FIG. 3 is a schematic diagram of displaying a preview image in a video shooting page provided by the embodiments of the present disclosure. As shown in FIG. 3, the display interface includes a first area and a second area, and the corresponding page sticker of the video shooting page is drawn in the first area of the display interface. The preview image is drawn in the second area of the display interface. So that the video shooting page displayed in the display interface may behave exactly the same as the video shooting page after it is fully started (that is, after the initialization of the camera unit is completed), avoiding the black screen (in the second area).

In the embodiments of the present disclosure, after shooting the first video through the camera unit of the terminal device, the video editing page is started, and the video editing page is used to edit the first video based on the editing instruction input by the user. In response to the shooting trigger instruction for the video editing page, the video editing page is closed and the video shooting page is started. The preview image is obtained based on the first video, and the preview image is displayed in the video shooting page until the camera unit is initialized. The preview image includes at least one video frame generated from the first video. When returning to the shooting page from the editing page, the preview image obtained from the first video shot previously will be displayed in the shooting page after processing, so as to avoid the video shooting page being in a black screen state, so that the video shooting page may instantly display the shot content in the appearance, thus improving the smoothness and appearance of generating synthesized video and improving the user experience.

Figure 4:
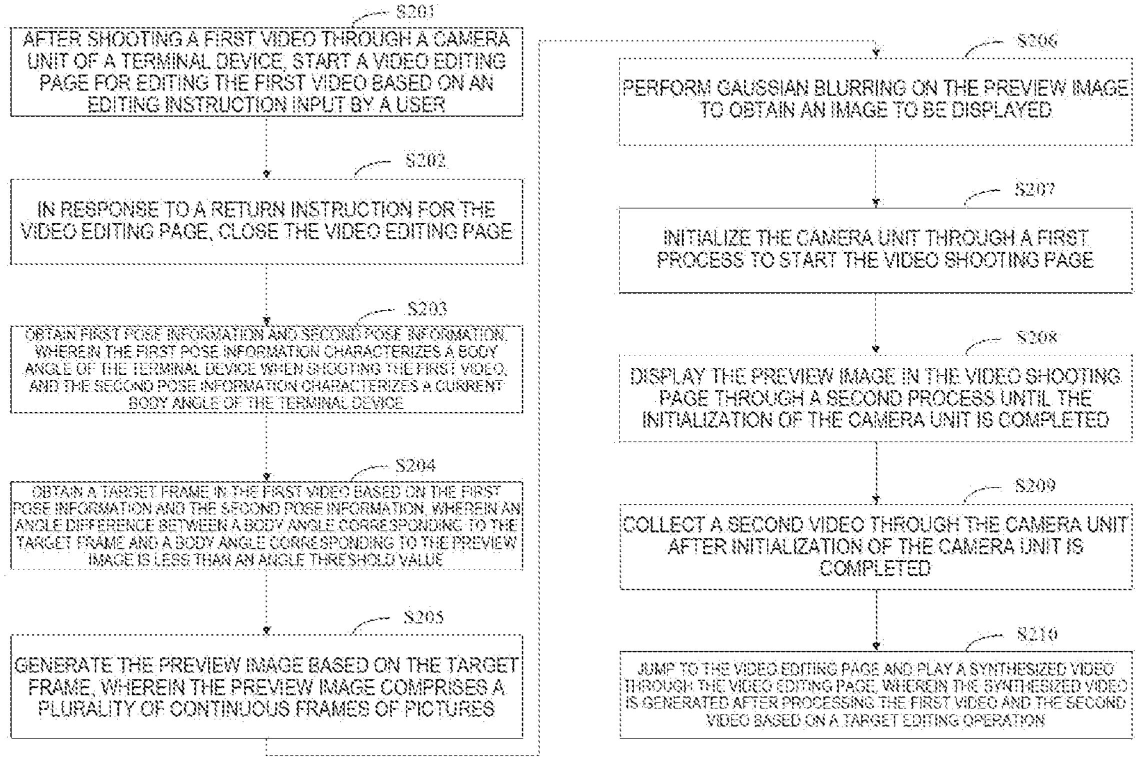
FIG. 4 is a flowchart II of a method of camera function page switching provided by the embodiments of the present disclosure.

Referring to FIG. 4, which is a flowchart II of a method of camera function page switching provided by the embodiments of the present disclosure. On the basis of the embodiments shown in FIG. 2, the embodiments of the present disclosure further detail the implementation steps of S101-S102. The method of camera function page switching includes the following steps.

At step S201: after shooting a first video through a camera unit of a terminal device, start a video editing page for editing the first video based on an editing instruction input by a user.

At step S202: in response to a return instruction for the video editing page, close the video editing page.

At step S203: obtain first pose information and second pose information, wherein the first pose information characterizes a body angle of the terminal device when shooting the first video, and the second pose information characterizes a current body angle of the terminal device.

For example, pose information is information used to characterize a shooting angle of the terminal device when shooting videos, that is, a body angle of the terminal device, where the body angle includes both a horizontal rotation angle and a vertical rotation angle of the body. Specifically, it may be obtained by collecting angle information through a sensor set in the terminal device, such as a gyroscope sensor. The first pose information is a body angle of the terminal device when shooting the first video, and the second pose information characterizes a current body angle of the terminal device, that is, the body angle when starting the video shooting page.

Herein, in one possible implementation, the first pose information is synchronously collected when the first video is shot. The first pose information includes pose sequence. The pose sequence includes at least one pose value. A pose value characterizes a body angle of the terminal device in the process of shooting the first video, and each pose value corresponds to a video frame. The second pose information is a value characterizing a body angle obtained in real time when starting the video shooting page. The pose value in the first pose information has the same data structure as the pose value in the second pose information. Therefore, the pose value of the first pose information may be compared with the pose value in the second pose information to achieve the comparison of body angle.

At Step S204: obtain a target frame in the first video based on the first pose information and the second pose information, wherein an angle difference between a body angle corresponding to the target frame and a body angle corresponding to the preview image is less than an angle threshold value.

In the application scenario corresponding to the embodiments of the present disclosure, when a user uses a terminal device (such as a smart phone) to shoot a short video, and when the user's own position and environment do not change significantly, the content of the image shot by the terminal device through the camera unit has a fixed mapping relationship with the shooting angle, that is, when the shooting angle is the same, the content of the image shot by the terminal device is similar or even the same. Based on the above discovery of the inventor, by using the different pose value in the first pose information to compare with the second pose information, the video frame shot from a body angle that is the same as the current body angle is taken as the target frame, and in the subsequent steps, the preview image is generated based on the target frame and displayed on the video shooting page, realizing the accurate prediction of the real-time image not displayed in the video shooting page (because the camera unit has not completed the initialization), making the image content in the preview image more similar to the image content of the real real-time image collected by the camera unit, and realizing a realistic replacement of the "black screen" process and improving the user's perception.

Figure 5:
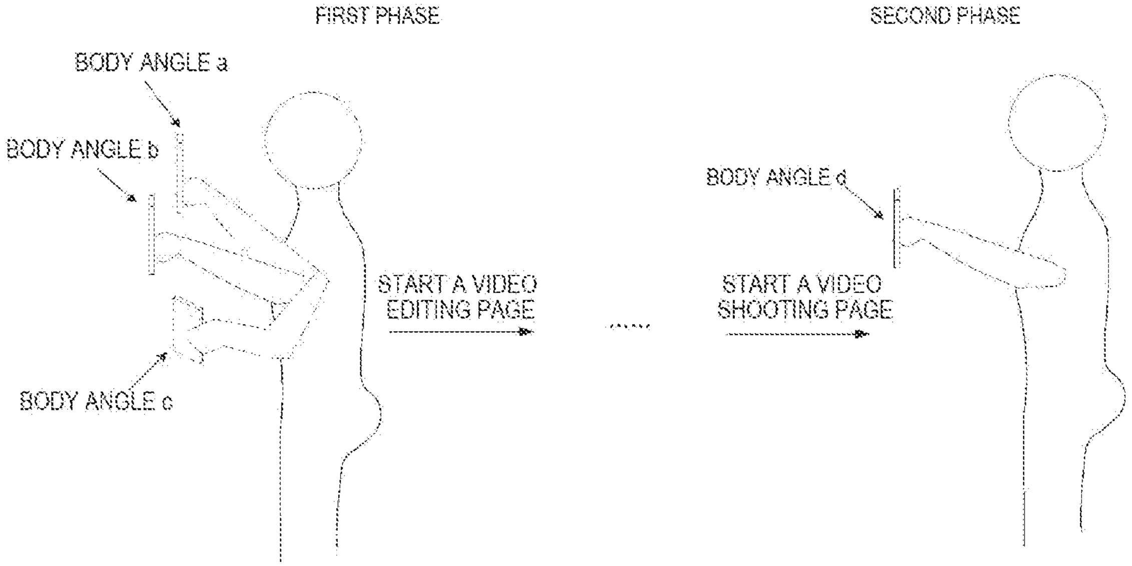
FIG. 5 is a schematic diagram of a process of obtaining a target frame based on pose information provided by the embodiments of the present disclosure.

FIG. 5 is a schematic diagram of a process of obtaining a target frame based on pose information provided by the embodiments of the present disclosure. As shown in FIG. 5, based on the user's operation, the terminal device shoots the first video at the first stage. With the change of the user's holding posture when shooting the first video, the terminal device's body changes accordingly. When the terminal device shoots the first video, it synchronously generates the corresponding pose sequence (that is, the first pose information). For example, the pose sequence includes a pose value A, a pose value B, and a pose value C, respectively corresponding to three body angles of the terminal device (illustrated as a body angle a, a body angle b, a body angle c in the figure). Then, the terminal device starts the video editing page to edit the first video (not shown in the figure). After the editing is completed, the terminal device responds to the shooting trigger instruction in the second stage, closes the video editing page, starts the video shooting page, and determines the pose value B whose angle difference is less than the angle threshold value according to the body angle d (the second pose information) at the current time (the time when the video shooting page is started) as the target pose value, and determines the video frame corresponding to the target pose value as the target frame.

Figure 6:
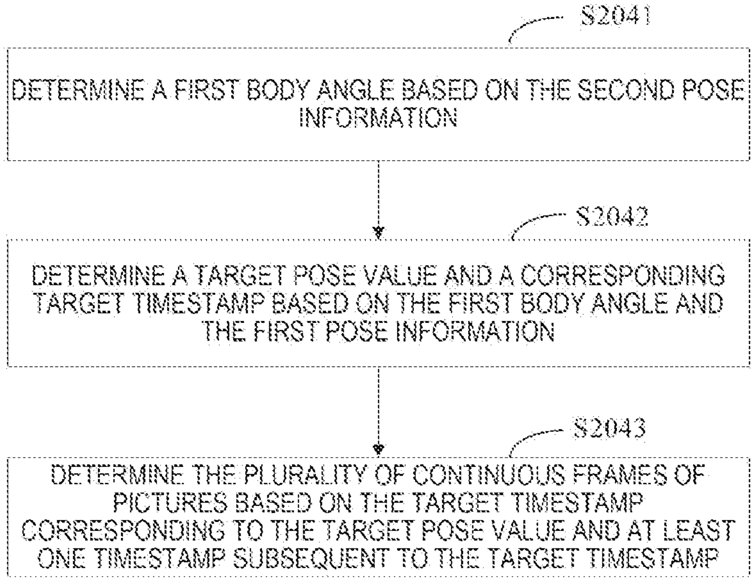
FIG. 6 is a flowchart of specific implementation steps of step S204 in the embodiments shown in FIG. 4.

In one possible implementation, the target frame includes a plurality of continuous frames of pictures. The first pose information includes a pose sequence and a corresponding timestamp sequence. The pose sequence includes at least one pose value. The pose value characterizes a body angle of the terminal device during the shooting of the first video. The timestamp sequence includes at least one timestamp. The timestamp corresponds to a pose value. The timestamp characterizes the obtaining time of the pose value, as well as the playing time of the first video. As shown in FIG. 6, step S204 includes three specific implementation steps: steps S2041, S2042, and S2043.

At step S2041: determine a first body angle based on the second pose information.

At step S2042: determine a target pose value and a corresponding target timestamp based on the first body angle and the first pose information.

At step S2043: determine the plurality of continuous frames of pictures based on the target timestamp corresponding to the target pose value and at least one timestamp subsequent to the target timestamp.

For example, the second pose information is the value characterizing a body angle obtained in real time when starting the video shooting page. Based on the value characterizing the body angle corresponding to the second pose information, the pose sequence corresponding to the first pose information is traversed to obtain the closest pose value, that is, the target pose value. Further, based on the timestamp sequence corresponding to the pose sequence, the target timestamp corresponding to the target pose value is obtained. After obtaining the target timestamp, the video frame corresponding to the target timestamp is obtained based on the corresponding relationship between the timestamp sequence and the first video, and then, for example, the corresponding video frames are obtained based on several consecutive timestamp subsequent to the target timestamp, so as to obtain the plurality of continuous frames of pictures, that is, target frame.

Figure 7:
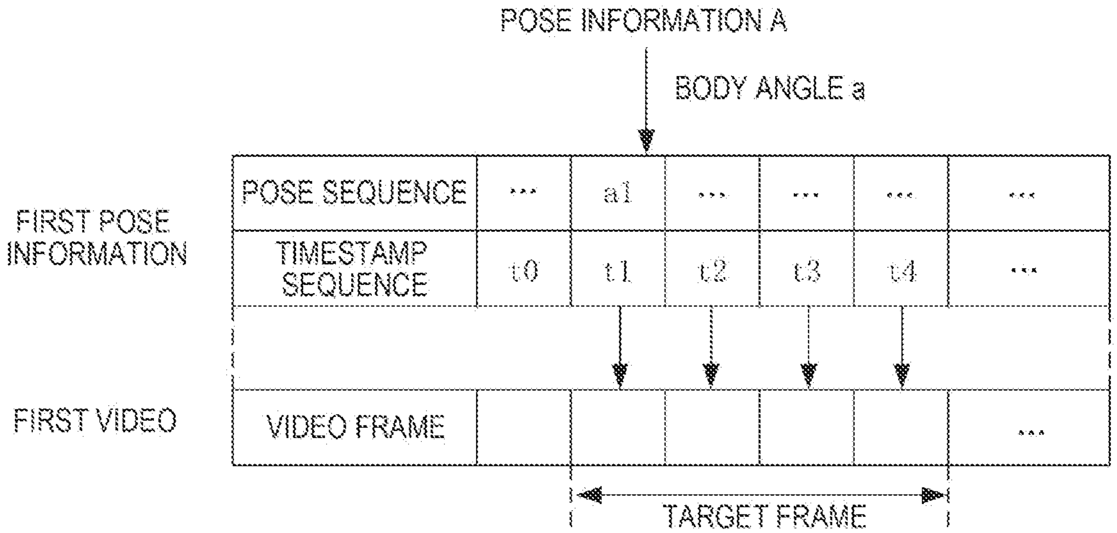
FIG. 7 is a schematic diagram of obtaining a multi frame picture provided by the embodiments of the present disclosure.

FIG. 7 is a schematic diagram of obtaining a multi frame picture provided by the embodiments of the present disclosure. As shown in FIG. 7, the corresponding body angle a is determined based on the pose information A (the second pose information) when starting the video shooting page. Then, from the first pose information corresponding to the first video (including a pose sequence and a timestamp sequence), the corresponding pose value a1 is determined, where the pose value a1 is the closest to the body angle and is less than the angle threshold value. Further, the corresponding target timestamp t1 and N timestamp (t2, t3, t4) subsequent to the target timestamp t1 are determined based on the pose value a1. Since the video frame corresponds to the timestamp one by one, the target timestamp and the video frame corresponding to the N timestamp subsequent to the target timestamp t are determined as the plurality of continuous frames of pictures, that is, target frame.

In the embodiments of the present disclosure, through the first pose information and the second pose information, the plurality of consecutive video frame matching the current body angle are obtained, and then the video clip may be displayed in the video shooting page as the preview image in the subsequent steps. While avoiding the "black screen" problem, the real-time image actually collected by the video shooting page is further simulated, so that the user may not perceive the start delay of the high video shooting page caused by the initialization process of the camera unit, improving the smoothness of operation and the user's experience.

At step S205: generate the preview image based on the target frame, wherein the preview image comprises a plurality of continuous frames of pictures.

For example, in one possible implementation, the target frame is the preview image, and the two are the same. The target frame generated in the above step, that is, the plurality of continuous frames of pictures, is directly used as the preview image for subsequent processing. In another possible implementation, the target frame obtained in the above steps may be processed, such as image frame fusion, image interpolation and other video processing steps, to generate the preview image, so that the image quality of the preview image is better and smoother. Herein, the specific implementation of the above video processing process is based on existing technology, which will not be repeated here.

At step S206: perform Gaussian blurring on the preview image to obtain an image to be displayed.

Optionally, after step S205, the image may be further performed Gaussian blurring on to generate an image to be displayed. Thus, the user may not observe the details of the image displayed in the video shooting page temporarily and may not perceive the process of terminal device replacing the "black screen" with the image to be displayed, so as to improve the user's experience. Herein, the steps for image processing mentioned above may be set according to specific needs, and the specific implementation is based on existing technology, which will not be repeated here.

At step S207: initialize the camera unit through a first process to start the video shooting page.

At step S208: display the preview image in the video shooting page through a second process until the initialization of the camera unit is completed.

For example, after obtaining the preview image, on the one hand, the "black screen" in the video shooting page may be avoided by displaying the image to be displayed; on the other hand, the video shooting page may be started by initializing the camera unit. At this time, the start of the video shooting page refers to the full start of the video shooting page, that is, the real time image actually shot by the camera unit may be obtained by calling the camera unit. In the steps of the embodiments of the present disclosure, by processing the initialization process of the camera unit and the display process of the image to be displayed (preview image) in separate process, the image to be displayed (preview image) may be displayed in the video shooting page for the first time, which may not be affected by the camera initialization process, implementing the appearance of instant startup of the video shooting page, and improving the visual effect and smoothness of operation.

At step S209: collect a second video through the camera unit after initialization of the camera unit is completed.

At step S210: jump to the video editing page and play a synthesized video through the video editing page, wherein the synthesized video is generated after processing the first video and the second video based on a target editing operation.

In the embodiments of the present disclosure, the implementation ways of step S201, step S202, step S209, and step S210 are the same as those of step S101, step S102, step S104, and step S105 in the embodiments shown in FIG. 2 of the present disclosure and will not be repeated here.

Figure 8:
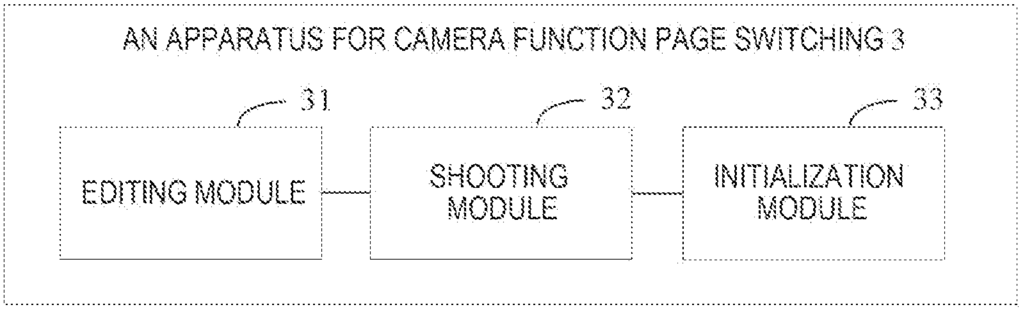
FIG. 8 is a structural block diagram of an apparatus for camera function page switching provided by the embodiments of the present disclosure.

Corresponding to the method of camera function page switching of the above embodiments, FIG. 8 is a structural block diagram of an apparatus for camera function page switching provided by the embodiments of the present disclosure. For the convenience of explanation, only the parts related to the embodiments of the present disclosure are shown. Referring to FIG. 8, the apparatus for camera function page switching 3 includes the following modules.

An editing module 31 is configured to start, based on a selected first video, a video editing page for editing the first video based on an editing instruction input by a user.

A shooting module 32 is configured to in response to a shooting trigger instruction for the video editing page, close the video editing page and start a video shooting page.

An initialization module 33 is configured to obtain a preview image based on the first video, and display the preview image in the video shooting page, wherein the preview image comprises at least one video frame generated based on the first video.

The shooting module 32 is further configured to collect a second video through the camera unit after initialization of the camera unit is completed.

The editing module 31 is further configured to jump to the video editing page and play a synthesized video through the video editing page, wherein the synthesized video is generated after processing the first video and the second video based on a target editing operation.

In one embodiment of the present disclosure, when obtaining the preview image based on the first video, the initialization module 33 is specifically configured for: obtaining first pose information and second pose information, wherein the first pose information characterizes a body angle of the terminal device when shooting the first video, and the second pose information characterizes a current body angle of the terminal device; obtaining a target frame in the first video based on the first pose information and the second pose information, wherein an angle difference between a body angle corresponding to the target frame and a body angle corresponding to the preview image is less than an angle threshold value; and generating the preview image based on the target frame.

In one embodiment of the present disclosure, the target frame comprises a plurality of continuous frames of pictures; the first pose information comprises a pose sequence and a corresponding timestamp sequence, the pose sequence comprises at least one pose value characterizing a body angle of the terminal device during the shooting of the first video, the timestamp sequence comprises at least one timestamp, and the timestamp corresponds one-to-one to the pose value. When obtaining the target frame in the first video based on the first pose information and the second pose information, the initialization module 33 is specifically configured for: determining a first body angle based on the second pose information; determining a target pose value and a corresponding target timestamp based on the first body angle and the first pose information; and determining the plurality of continuous frames of pictures based on the target timestamp corresponding to the target pose value and at least one timestamp subsequent to the target timestamp.

In one embodiment of the present disclosure, the preview image comprises a plurality of continuous frames of pictures. The initialization module 33 the preview image in the video shooting page, including: displaying the plurality of continuous frames of pictures sequentially in the video shooting page within a predetermined duration, wherein the predetermined duration characterizes an initialization duration of the camera unit.

In one embodiment of the present disclosure, before displaying the preview image in the video shooting page, the initialization module 33 is further configured for: performing Gaussian blurring on the preview image to obtain an image to be displayed. When displaying the preview image in the video shooting page, the initialization module 33 is specifically configured for: displaying the image to be displayed in the video shooting page.

In one embodiment of the present disclosure, the terminal device has a display interface, and the initialization module 33 displays the preview image in the video shooting page, specifically comprising: drawing a page sticker corresponding to the video shooting page in a first area of the display interface; and drawing the preview image in a second area of the display interface.

In one embodiment of the present disclosure, after closing the video editing page, the shooting module 32 is further configured for setting a rendering environment as an initialized rendering environment, wherein the initialized rendering environment is used for drawing the video shooting page and the preview image in the display interface.

In one embodiment of the present disclosure, when starting the video shooting page, the shooting module 32 is specifically configured for initializing the camera unit through a first process to start the video shooting page. When displaying the preview image in the video shooting page, the initialization module 33 is specifically configured for displaying the preview image in the video shooting page through a second process.

The editing module 31, the shooting module 32 and the initialization module 33 are connected in turn. The apparatus for camera function page switching 3 provided by the embodiments of the present disclosure may implement the technical solution of the embodiments of the above method. Its implementation principle and technical effect are similar, and the embodiments of the present disclosure will not be repeated here.

Figure 9:
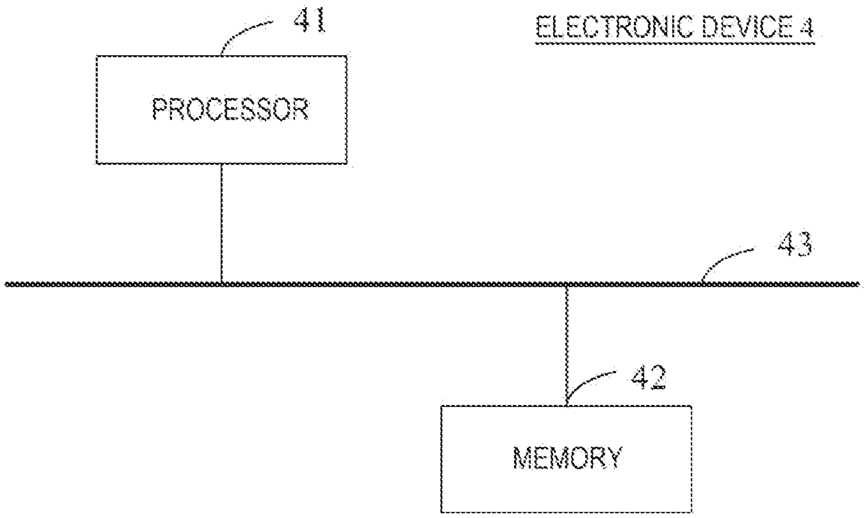
FIG. 9 is a structural schematic diagram of an electronic device provided by the embodiments of the present disclosure.

FIG. 9 is a structural schematic diagram of an electronic device provided by the embodiments of the present disclosure. As shown in FIG. 9, the electronic device 4 includes: a processor 41, and a memory 42 connected to the processor 41 in communication.

The memory 42 stores computer execution instructions.

The processor 41 executes the computer execution instructions stored in the memory 42 to implement the method of camera function page switching according to the embodiments shown in FIGS. 2 to 7.

Optionally, the processor 41 and memory 42 are connected via a bus 43.

The relevant description can be understood by referring to the relevant description and effect corresponding to the steps in the embodiments corresponding to FIGS. 2 to 7 and will not be repeated here.

Figure 10:
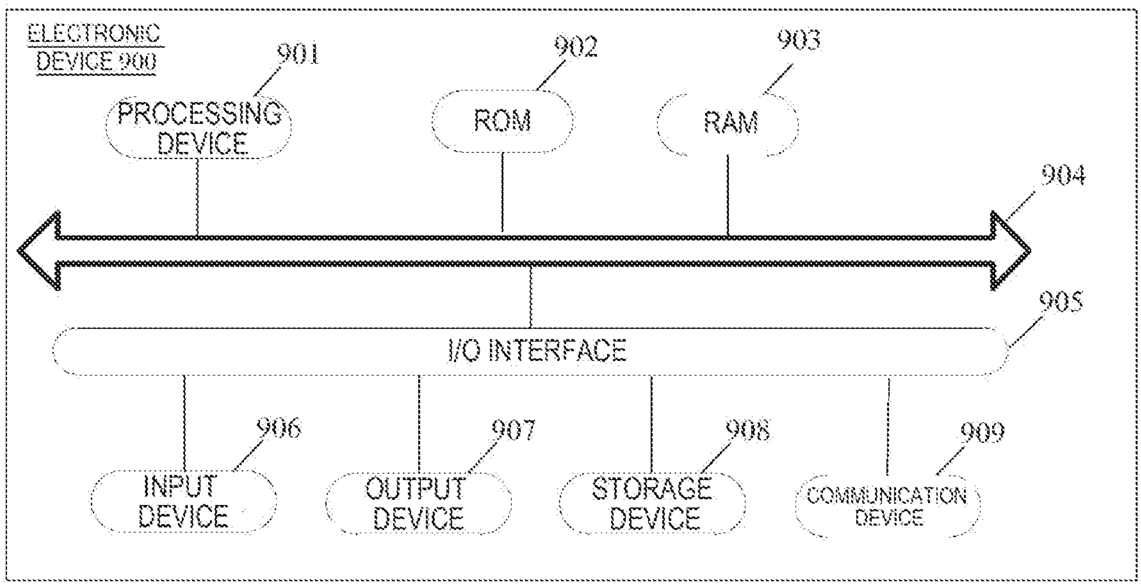
FIG. 10 is a schematic diagram of hardware structure of an electronic device provided by the embodiments of the present disclosure.

Referring to FIG. 10, it shows a structural diagram of an electronic device 900 suitable for implementing the embodiments of the present disclosure. The electronic device 900 may be a terminal device or a server. Herein, the terminal device may include but are not limited to mobile terminals such as mobile phones, laptops, digital broadcast receivers, personal digital assistants (PDA), portable Android devices (PAD), portable media players (PMP), car-mounted terminals (such as vehicle navigation terminals), and fixed terminals such as digital TV, desktop computers, etc. The electronic device shown in FIG. 10 is only an example and should not bring any limitation on the function and scope of use of the embodiments of the present disclosure.

As shown in FIG. 10, the electronic device 900 may include a processing device (such as a central processing unit, graphics processing unit, etc.) 901, the electronic device 900 may perform various actions and processes based on programs stored in Read-Only Memory (ROM) 902 or loaded from storage device 908 into Random Access Memory (RAM) 903. In the RAM 903, various programs and data necessary for the operation of the electronic device 900 are also stored. The processing device 901, ROM 902, and RAM 903 are connected to each other through a bus 904. An Input/Output (I/O) interface 905 is also connected to the bus 904.

Typically, the following devices can be connected to I/O interface 905: input devices 906 including, for example, touch screens, touchpads, keyboards, mice, cameras, microphones, accelerometers, gyroscopes, etc.; output devices 907 including liquid crystal displays (LCDs), speakers, vibrators, etc.; storage devices 908 including magnetic tapes, hard disks, etc.; and a communication device 909. The communication device 909 may allow the electronic device 900 to communicate with other devices wirelessly or wirelessly to exchange data. Although FIG. 10 illustrates an electronic device 900 with various devices, it should be understood that it is not required to implement or have all the devices shown. It can be implemented or equipped with more or fewer devices as an alternative.

In particular, according to the embodiments of the present disclosure, the process described above with reference to the flowchart can be implemented as a computer software program. For example, an embodiment of the present disclosure includes a computer program product, and the computer program product includes a computer program carried on a computer-readable medium, where the computer program includes program code for performing a method for recommending words.

In such an embodiment, the computer program can be downloaded and installed from a network through the communication device 909, or installed through the storage device 908, or installed through the ROM 902. When the computer program is executed by the processing device 901, the above functions defined in the method of the embodiment of the present disclosure are performed.

It should be noted that the computer-readable medium described above can be a computer-readable signal medium or a computer-readable storage medium, or any combination thereof. The computer-readable storage medium can be, for example, but not limited to, an electrical, magnetic, optical, electromagnetic, infrared, or semiconductor system, apparatus, or device, or any combination thereof. The computer-readable storage media may include but are not limited to: an electrical connection with one or more wires, a portable computer disk, a hard disk, random access memory (RAM), read-only memory (ROM), an erasable programmable read-only memory (EPROM or flash memory), an optical fiber, a portable compact disk read-only memory (CD-ROM), an optical storage device, a magnetic storage device, or any combination thereof. In the present disclosure, a computer-readable storage medium may be any tangible medium containing or storing a program that can be used by an instruction execution system, apparatus, or device, or can be used in combination with an instruction execution system, apparatus, or device. In the present disclosure, a computer-readable signal medium can include a data signal propagated in baseband or as a carrier wave, the computer-readable signal medium carries computer-readable program code therein. Such propagated data signals may take many forms, including but not limited to electromagnetic signals, optical signals, or any combination thereof. A computer-readable signal medium may also be any computer-readable medium other than a computer-readable storage medium, which can send, propagate, or transmit programs for use by or in conjunction with instruction execution systems, apparatus, or devices. The program code contained on the computer-readable medium may be transmitted using any suitable medium, the medium includes but not limited to: wires, optical cables, RF (radio frequency), etc., or any combination thereof.

The computer readable medium may be included in the electronic device or may exist separately without being assembled into the electronic device.

The computer readable medium carries one or more programs. When the one or more programs are executed by an electronic device, the electronic device executes the method shown in the above embodiments.

Computer program codes for performing the operations of the present disclosure may be written in one or more programming languages or a combination thereof, including but not limited to Object Oriented programming languages—such as Java, Smalltalk, C++, and also conventional procedural programming languages—such as "C" or similar programming languages. The program code may be executed entirely on the user's computer, partially executed on the user's computer, executed as a standalone software package, partially executed on the user's computer and partially on a remote computer, or entirely on a remote computer or server. In the case of involving a remote computer, the remote computer may be any kind of network-including LAN or WAN-connected to the user's computer, or may be connected to an external computer (e.g., through an Internet service provider to connect via the Internet).

The flowcharts and block diagrams in the accompanying drawings illustrate the architecture, functions, and operations of possible implementations of the system, method, and computer program product of various embodiments of the present disclosure. Each block in a flowchart or block diagram may represent a module, program segment, or portion of code that contains one or more executable instructions for implementing a specified logical function. It should also be noted that in some alternative implementations, the functions marked in the blocks may occur in a different order than those marked in the drawings. For example, two consecutive blocks may actually be executed in parallel, or they may sometimes be executed in reverse order, depending on the function involved. It should also be noted that each block in the block diagrams and/or flowcharts, as well as combinations of blocks in the block diagrams and/or flowcharts, may be implemented using a dedicated hardware-based system that performs the specified function or operations, or may be implemented using a combination of dedicated hardware and computer instructions.

The unit described in the embodiments of the present disclosure may be implemented by means of software or hardware. In some cases, the name of the module does not constitute a limitation on the module itself. For example, the editing module may further be described as "a module for starting the video editing page based on the selected first video".

The functions described herein above can be performed at least in part by one or more hardware logic components. For example, without limitation, exemplary types of hardware logic components that may be used include: Field Programmable Gate Arrays (FPGAs), Application Specific Integrated Circuits (ASICs), Application Specific Standard Parts (ASSPs), System on Chip (SOCs), Complex Programmable Logic Devices (CPLDs), and so on.

In the context of present disclosure, a machine-readable medium can be a tangible medium that may contain or store programs for use by or in conjunction with instruction execution systems, apparatuses, or devices. A machine-readable medium may be a machine-readable signal medium or a machine-readable storage medium. A machine-readable medium may include, but are not limited to, electronic, magnetic, optical, electromagnetic, infrared, or semiconductor systems, apparatuses, or devices, or any suitable combination thereof. Specific examples of the machine-readable storage medium may include electrical connections based on one or more wires, portable computer disks, hard disks, RAM, ROM, EPROM or flash memory, optical fibers, CD-ROM, optical storage devices, magnetic storage devices, or any combination thereof.

In a first aspect, according to one or more embodiments of the present disclosure, a method of camera function page switching is provided, which is applied to a terminal device. The terminal device has a camera unit, and the method includes:

starting, based on a selected first video, a video editing page for editing the first video based on an editing instruction input by a user; in response to a shooting trigger instruction for the video editing page, closing the video editing page and starting a video shooting page; obtaining a preview image based on the first video, and displaying the preview image in the video shooting page, wherein the preview image comprises at least one video frame generated based on the first video; collecting a second video through the camera unit after initialization of the camera unit is completed; jumping to the video editing page and playing a synthesized video through the video editing page, wherein the synthesized video is generated after processing the first video and the second video based on a target editing operation.

According to one or more embodiments of the disclosure, obtaining the preview image based on the first video comprises: obtaining first pose information and second pose information, wherein the first pose information characterizes a body angle of the terminal device when shooting the first video, and the second pose information characterizes a current body angle of the terminal device; obtaining a target frame in the first video based on the first pose information and the second pose information, wherein an angle difference between a body angle corresponding to the target frame and a body angle corresponding to the preview image is less than an angle threshold value; and generating the preview image based on the target frame.

According to one or more embodiments of the present disclosure, the target frame comprises a plurality of continuous frames of pictures; the first pose information comprises a pose sequence and a corresponding timestamp sequence, the pose sequence comprises at least one pose value characterizing a body angle of the terminal device during the shooting of the first video, the timestamp sequence comprises at least one timestamp, and the timestamp corresponds one-to-one to the pose value; obtaining the target frame in the first video based on the first pose information and the second pose information comprises: determining a first body angle based on the second pose information; determining a target pose value and a corresponding target timestamp based on the first body angle and the first pose information; determining the plurality of continuous frames of pictures based on the target timestamp corresponding to the target pose value and at least one timestamp subsequent to the target timestamp.

According to one or more embodiments of the present disclosure, the preview image comprises a plurality of continuous frames of pictures; and displaying the preview image in the video shooting page comprises: displaying the plurality of continuous frames of pictures sequentially in the video shooting page within a predetermined duration, wherein the predetermined duration characterizes an initialization duration of the camera unit.

According to one or more embodiments of the present disclosure, after the initialization of the camera unit is completed, the method further includes: obtaining a real-time image through the camera unit; and displaying the real-time image in the video shooting page.

According to one or more embodiments of the present disclosure, before displaying the preview image in the video shooting page, the method further comprises: performing Gaussian blurring on the preview image to obtain an image to be displayed; displaying the preview image in the video shooting page comprises: displaying the image to be displayed in the video shooting page.

According to one or more embodiments of the present disclosure, the terminal device has a display interface, and displaying the preview image in the video shooting page comprises: drawing a page sticker corresponding to the video shooting page in a first area of the display interface; drawing the preview image in a second area of the display interface.

According to one or more embodiments of the present disclosure, after closing the video editing page, the method further comprises: setting a rendering environment as an initialized rendering environment, wherein the initialized rendering environment is used for drawing the video shooting page and the preview image in the display interface.

According to one or more embodiments of the present disclosure, starting the video shooting page comprises: initializing the camera unit through a first process to start the video shooting page; displaying the preview image in the video shooting page comprises: displaying the preview image in the video shooting page through a second process.

In a second aspect, according to one or more embodiments of the present disclosure, an apparatus for camera function page switching is provided, which includes:

- an editing module configured for starting, based on a selected first video, a video editing page for editing the first video based on an editing instruction input by a user;
- a shooting module configured for in response to a shooting trigger instruction for the video editing page, closing the video editing page and starting a video shooting page;
- an initialization module configured for obtaining a preview image based on the first video, and displaying the preview image in the video shooting page, wherein the preview image comprises at least one video frame generated based on the first video.

According to one or more embodiments of the disclosure, when obtaining the preview image based on the first video, the initialization module is specifically configured for: obtaining first pose information and second pose information, wherein the first pose information characterizes a body angle of the terminal device when shooting the first video, and the second pose information characterizes a current body angle of the terminal device; obtaining a target frame in the first video based on the first pose information and the second pose information, wherein an angle difference between a body angle corresponding to the target frame and a body angle corresponding to the preview image is less than an angle threshold value; and generating the preview image based on the target frame.

According to one or more embodiments of the present disclosure, the target frame comprises a plurality of continuous frames of pictures; the first pose information comprises a pose sequence and a corresponding timestamp sequence, the pose sequence comprises at least one pose value characterizing a body angle of the terminal device during the shooting of the first video, the timestamp sequence comprises at least one timestamp, and the timestamp corresponds one-to-one to the pose value. When obtaining the target frame in the first video based on the first pose information and the second pose information, the initialization module is specifically configured for: determining a first body angle based on the second pose information; determining a target pose value and a corresponding target timestamp based on the first body angle and the first pose information; and determining the plurality of continuous frames of pictures based on the target timestamp corresponding to the target pose value and at least one timestamp subsequent to the target timestamp.

According to one or more embodiments of the present disclosure, the preview image includes a plurality of continuous frames of pictures. The initialization module displays the preview image in the video shooting page, including: displaying the plurality of continuous frames of pictures sequentially in the video shooting page within a predetermined duration, wherein the predetermined duration characterizes an initialization duration of the camera unit.

According to one or more embodiments of the present disclosure, after the camera unit is initialized, the initialization module is further configured to: collect a real-time image through the camera unit; and display the real-time image in the video shooting page.

According to one or more embodiments of the present disclosure, before displaying the preview image in the video shooting page, the initialization module is further configured for: performing Gaussian blurring on the preview image to obtain an image to be displayed. When the initialization module displays the preview image in the video shooting page, it is specifically configured to display the image to be displayed in the video shooting page.

According to one or more embodiments of the present disclosure, the terminal device has a display interface, and the initialization module displays the preview image in the video shooting page, specifically configured for: drawing a page sticker corresponding to the video shooting page in a first area of the display interface; and drawing the preview image in a second area of the display interface.

According to one or more embodiments of the present disclosure, after closing the video editing page, the shooting module is further configured for: setting a rendering environment as an initialized rendering environment, wherein the initialized rendering environment is used for drawing the video shooting page and the preview image in the display interface.

According to one or more embodiments of the present disclosure, when starting the video shooting page, the shooting module is specifically configured for initializing the camera unit through a first process to start the video shooting page. When the initialization module displays the preview image in the video shooting page, it is specifically configured to display the preview image in the video shooting page through a second process.

In a third aspect, according to one or more embodiments of the present disclosure, an electronic device is provided, which comprises a processor and a memory communicated with the processor.

The memory stores computer execution instructions.

The processor executes the computer execution instructions stored in the memory to implement the method of camera function page switching described in the first aspect above and various possible designs in the first aspect.

In a fourth aspect, the embodiments of the present disclosure provide a computer readable storage medium, in which a computer execution instruction is stored. A processor executes the computer execution instruction to implement the method of camera function page switching described in the first aspect above and various possible designs in the first aspect.

In a fifth aspect, the embodiments of the present disclosure provide a computer program product, which includes a computer program. When the computer program is executed by a processor, the method of camera function page switching described in the first aspect above and various possible designs in the first aspect are implemented.

In a sixth aspect, the embodiments of the present disclosure provide a computer program that, when executed by a processor, implements the method of camera function page switching described in the first aspect above and various possible designs in the first aspect.

The method, apparatus, electronic device, storage medium, computer program product and computer program for camera function page switching provided by the embodiments of the present disclosure, start, based on a selected first video, a video editing page for editing the first video based on an editing instruction input by a user; in response to a shooting trigger instruction for the video editing page, close the video editing page and start a video shooting page; obtain a preview image based on the first video, and display the preview image in the video shooting page, wherein the preview image comprises at least one video frame generated based on the first video; collect a second video through the camera unit after initialization of the camera unit is completed; and jump to the video editing page and play a synthesized video through the video editing page, wherein the synthesized video is generated after processing the first video and the second video based on a target editing operation. When returning to the shooting page from the editing page, the preview image obtained by processing the first video previously shot is displayed in the shooting page, avoiding the video shooting page from being in a black screen state, so that the video shooting page can instantly display the shooting content, thereby improving the fluency and appearance of the generated composite video and improving the user experience.

The above description is only for the preferred embodiments of the present disclosure and an explanation of the technical principles used. Those skilled in the art should understand that the scope involved in the present disclosure is not limited to technical solutions formed by specific combinations of the aforementioned technical features and should also cover other technical solutions formed by any combinations of the aforementioned technical features or their equivalent features without departing from the disclosed concept. For example, a technical solution is formed by replacing the above features with (but not limited to) technical features with similar functions disclosed in the present disclosure.

Furthermore, although operations are depicted in a specific order, this should not be understood as requiring that these operations be performed in the specific order shown or performed in a sequential order. In certain environments, multitasking and parallel processing may be advantageous. Likewise, although several specific implementation details are included in the above discussion, these should not be interpreted as limitations on the scope of present disclosure. Certain features described in the context of individual embodiments may also be combined to be implemented in a single embodiment. On the contrary, various features described in the context of a single embodiment may also be implemented separately or in any suitable sub combination in multiple embodiments.

Although the present subject matter has been described in language specific to structural features and/or methodological logical actions, it should be understood that the subject matter defined in the attached claims may not necessarily be limited to the specific features or acts described above. On the contrary, the specific features and actions described above are only example forms of implementing the claims.

I claim:

1. A method of camera function page switching, applied to a terminal device with a camera unit, the method comprising:

starting, based on a first video that is an existing video, a video editing page for editing the first video based on an editing instruction input by a user;

in response to a shooting trigger instruction for the video editing page, closing the video editing page and starting a video shooting page, wherein the video shooting page is configured to generate a new video based on real-time images collected by the camera unit;

obtaining a preview image based on the first video, wherein the preview image comprises at least one video frame generated based on the first video;

performing Gaussian blurring on the preview image to obtain an image to be displayed;

displaying the preview image in the video shooting page during a period of initializing the camera unit, wherein displaying the preview image in the video shooting page comprises displaying the image to be displayed in the video shooting page;

collecting a second video through the camera unit after initialization of the camera unit is completed; and jumping to the video editing page and playing a synthesized video through the video editing page, wherein the synthesized video is generated after processing the first video and the second video based on a target editing operation.

2. The method of claim 1, wherein obtaining the preview image based on the first video comprises:

obtaining first pose information and second pose information, wherein the first pose information characterizes a body angle of the terminal device when shooting the first video, and the second pose information characterizes a current body angle of the terminal device;

obtaining a target frame in the first video based on the first pose information and the second pose information, wherein an angle difference between a body angle corresponding to the target frame and a body angle corresponding to the preview image is less than an angle threshold value; and generating the preview image based on the target frame.

3. The method of claim 2, wherein the target frame comprises a plurality of continuous frames of pictures; the first pose information comprises a pose sequence and a corresponding timestamp sequence, the pose sequence comprises at least one pose value characterizing a body angle of the terminal device during the shooting of the first video, the timestamp sequence comprises at least one timestamp corresponding to the at least one pose value, respectively;

wherein obtaining the target frame in the first video based on the first pose information and the second pose information comprises:

determining a first body angle based on the second pose information;

determining a target pose value and a corresponding target timestamp based on the first body angle and the first pose information; and determining the plurality of continuous frames of pictures based on the target timestamp corresponding to the target pose value and at least one timestamp subsequent to the target timestamp.

4. The method of claim 1, wherein the preview image comprises a plurality of continuous frames of pictures; and displaying the preview image in the video shooting page comprises:

displaying the plurality of continuous frames of pictures sequentially in the video shooting page within a predetermined duration, wherein the predetermined duration characterizes an initialization duration of the camera unit.

5. The method of claim 1, wherein the terminal device has a display interface, and displaying the preview image in the video shooting page comprises:

drawing a page sticker corresponding to the video shooting page in a first area of the display interface; and drawing the preview image in a second area of the display interface.

6. The method of claim 5, wherein after closing the video editing page, the method further comprises:

setting a rendering environment as an initialized rendering environment, wherein the initialized rendering environment is used for drawing the video shooting page and the preview image in the display interface.

7. The method of claim 1, wherein starting the video shooting page comprises:

initializing the camera unit through a first process to start the video shooting page;

wherein displaying the preview image in the video shooting page comprises:

displaying the preview image in the video shooting page through a second process.

8. An electronic device, comprising: a processor, and a memory in communication connection with the processor; the memory storing computer execution instructions; the processor executing the computer execution instructions stored in the memory to implement acts of camera function page switching, the acts comprising:

starting, based on a first video that is an existing video, a video editing page for editing the first video based on an editing instruction input by a user;

in response to a shooting trigger instruction for the video editing page, closing the video editing page and starting a video shooting page, wherein the video shooting page is configured to generate a new video based on real-time images collected by a camera unit;

obtaining a preview image based on the first video, wherein the preview image comprises at least one video frame generated based on the first video;

performing Gaussian blurring on the preview image to obtain an image to be displayed;

displaying the preview image in the video shooting page during a period of initializing the camera unit, wherein displaying the preview image in the video shooting page comprises displaying the image to be displayed in the video shooting page;

collecting a second video through the camera unit after initialization of the camera unit is completed; and jumping to the video editing page and playing a synthesized video through the video editing page, wherein the synthesized video is generated after processing the first video and the second video based on a target editing operation.

9. The electronic device of claim 8, wherein obtaining the preview image based on the first video comprises:

obtaining first pose information and second pose information, wherein the first pose information characterizes a body angle of the terminal device when shooting the first video, and the second pose information characterizes a current body angle of the terminal device;

obtaining a target frame in the first video based on the first pose information and the second pose information, wherein an angle difference between a body angle corresponding to the target frame and a body angle corresponding to the preview image is less than an angle threshold value; and generating the preview image based on the target frame.

10. The electronic device of claim 9, wherein the target frame comprises a plurality of continuous frames of pictures; the first pose information comprises a pose sequence and a corresponding timestamp sequence, the pose sequence comprises at least one pose value characterizing a body angle of the terminal device during the shooting of the first video, the timestamp sequence comprises at least one timestamp corresponding to the at least one pose value, respectively;

wherein obtaining the target frame in the first video based on the first pose information and the second pose information comprises:

determining a first body angle based on the second pose information;

determining a target pose value and a corresponding target timestamp based on the first body angle and the first pose information; and determining the plurality of continuous frames of pictures based on the target timestamp corresponding to the target pose value and at least one timestamp subsequent to the target timestamp.

11. The electronic device of claim 8, wherein the preview image comprises a plurality of continuous frames of pictures; and displaying the preview image in the video shooting page comprises:

displaying the plurality of continuous frames of pictures sequentially in the video shooting page within a predetermined duration, wherein the predetermined duration characterizes an initialization duration of the camera unit.

12. The electronic device of claim 8, wherein the terminal device has a display interface, and displaying the preview image in the video shooting page comprises:

drawing a page sticker corresponding to the video shooting page in a first area of the display interface; and drawing the preview image in a second area of the display interface.

13. The electronic device of claim 12, wherein after closing the video editing page, the acts further comprise:

setting a rendering environment as an initialized rendering environment, wherein the initialized rendering environment is used for drawing the video shooting page and the preview image in the display interface.

14. The electronic device of claim 8, wherein starting the video shooting page comprises:

initializing the camera unit through a first process to start the video shooting page;

wherein displaying the preview image in the video shooting page comprises:

displaying the preview image in the video shooting page through a second process.

15. A non-transitory computer readable storage medium storing a computer execution instruction, the computer execution instruction, when a processor executes the computer execution instruction, implementing acts of camera function page switching, the acts comprising:

starting, based on a first video that is an existing video, a video editing page for editing the first video based on an editing instruction input by a user;

in response to a shooting trigger instruction for the video editing page, closing the video editing page and starting a video shooting page, wherein the video shooting page is configured to generate a new video based on real-time images collected by a camera unit;

obtaining a preview image based on the first video, wherein the preview image comprises at least one video frame generated based on the first video;

performing Gaussian blurring on the preview image to obtain an image to be displayed;

displaying the preview image in the video shooting page during a period of initializing the camera unit, wherein displaying the preview image in the video shooting page comprises displaying the image to be displayed in the video shooting page;

collecting a second video through the camera unit after initialization of the camera unit is completed; and jumping to the video editing page and playing a synthesized video through the video editing page, wherein the synthesized video is generated after processing the first video and the second video based on a target editing operation.

16. The non-transitory computer readable storage medium of claim 15, wherein obtaining the preview image based on the first video comprises:

obtaining first pose information and second pose information, wherein the first pose information characterizes a body angle of the terminal device when shooting the first video, and the second pose information characterizes a current body angle of the terminal device;

obtaining a target frame in the first video based on the first pose information and the second pose information, wherein an angle difference between a body angle corresponding to the target frame and a body angle corresponding to the preview image is less than an angle threshold value; and generating the preview image based on the target frame.

17. The non-transitory computer readable storage medium of claim 16, wherein the target frame comprises a plurality of continuous frames of pictures; the first pose information comprises a pose sequence and a corresponding timestamp sequence, the pose sequence comprises at least one pose value characterizing a body angle of the terminal device during the shooting of the first video, the timestamp sequence comprises at least one timestamp corresponding to the at least one pose value, respectively;

wherein obtaining the target frame in the first video based on the first pose information and the second pose information comprises:

determining a first body angle based on the second pose information;

determining a target pose value and a corresponding target timestamp based on the first body angle and the first pose information; and determining the plurality of continuous frames of pictures based on the target timestamp corresponding to the target pose value and at least one timestamp subsequent to the target timestamp.

18. The non-transitory computer readable storage medium of claim 15, wherein the preview image comprises a plurality of continuous frames of pictures; and displaying the preview image in the video shooting page comprises:

displaying the plurality of continuous frames of pictures sequentially in the video shooting page within a predetermined duration, wherein the predetermined duration characterizes an initialization duration of the camera unit.

19. The non-transitory computer readable storage medium of claim 15, wherein the terminal device has a display interface, and displaying the preview image in the video shooting page comprises:

drawing a page sticker corresponding to the video shooting page in a first area of the display interface; and drawing the preview image in a second area of the display interface.

20. The non-transitory computer readable storage medium of claim 15, wherein starting the video shooting page comprises initializing the camera unit through a first process to start the video shooting page; and wherein displaying the preview image in the video shooting page comprises displaying the preview image in the video shooting page through a second process.

* * * * *